Jan. 9, 1968 M. KUTS 3,362,273
APPARATUS AND METHOD FOR PREPARING GOLF
BALL THREAD FOR WINDING
Filed May 4, 1964 3 Sheets-Sheet 1
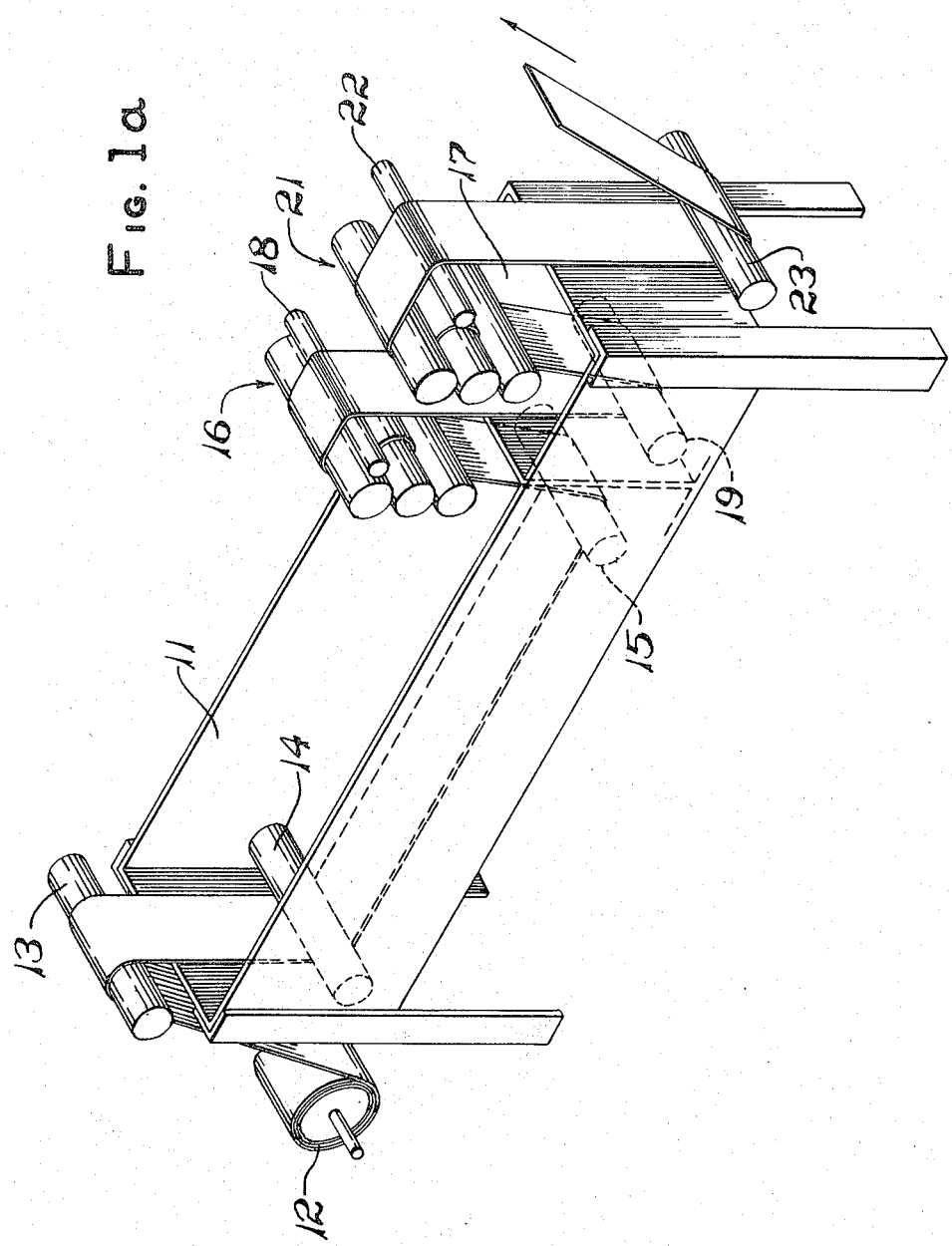
INVENTOR.
MATHEW KUTS
BY Joseph Januszkiewicz
ATTY.

INVENTOR.
MATHEW KUTS
BY Joseph Januszkiewicz
ATTY.

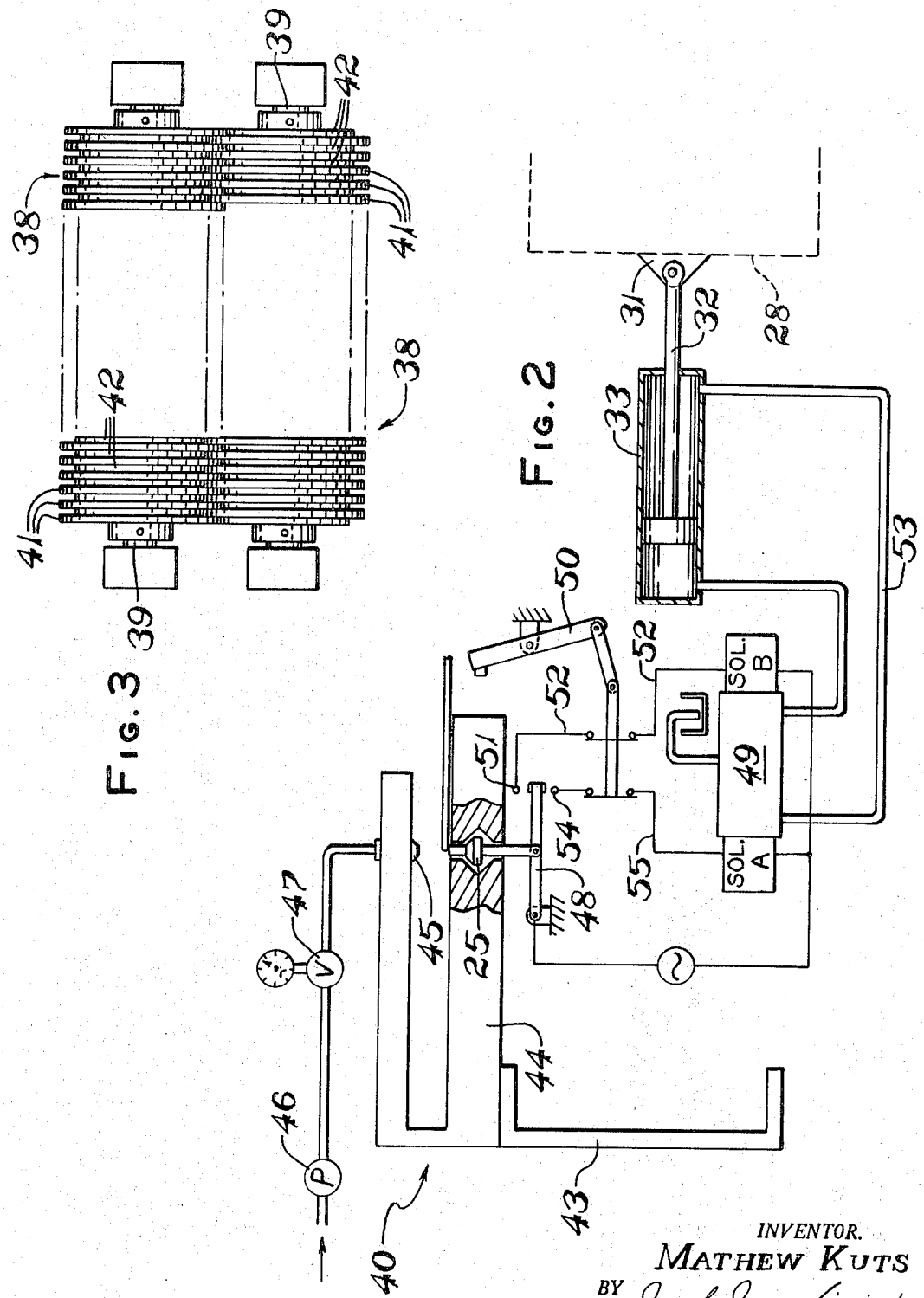

United States Patent Office 3,362,273
Patented Jan. 9, 1968

3,362,273
APPARATUS AND METHOD FOR PREPARING GOLF BALL THREAD FOR WINDING
Mathew Kuts, Akron, Ohio, assignor to The B. F. Goodrich Company, New York, N.Y., a corporation of New York
Filed May 4, 1964, Ser. No. 364,546
6 Claims. (Cl. 83—368)

ABSTRACT OF THE DISCLOSURE

An apparatus for preparing golf ball thread including a cutting apparatus having a carriage mounted on a base adjacent to an elastic web supply means wherein the carriage has guide means thereon which is laterally movable with the carriage on the base in response to sensing means which positions the carriage and guide means in response to the location on the edge of the elastic material passing from the supply means to the guide means to thereby maintain a predetermined aligned relationship between the longitudinal center pass line of the elastic web to assure that the cutters on the carriage slice the elastic web into a plurality of thin strips continuously with minimum waste compensating for the tendency of the elastic web to vary laterally as it is unwound from the supply means.

---

This invention relates to the method and apparatus for making rubber thread and more particularly to a new and improved method and apparatus for cutting sheet rubber into strips or thread and winding such cut strips or rubber thread into spools for use in the winding of golf balls.

Heretofore, such rubber thread has been made by wrapping a sheet of vulcanized calendered rubber in several layers upon a large drum, rotating such drum slowly and slowly cutting the sheet into threads by means of a rotary knife mounted upon a lathe type support. Such cutting was performed at a uniform rate depending upon the desired thread size; however, one difficulty encountered in such process was maintaining uniform size of thread or ribbon. The rate of winding onto the drum initially of the sheet rubber must be so governed to maintain uniform tension such that after the cutting operation and when the rubber is released from tension, the cut thread will contract in length and simultaneously increase in diameter. After such cutting operation, difficulty has been encountered in untangling the entire mass of cut threads. Because of the many operations such method of manufacture was expensive.

Other methods and apparatus cut a continuously longitudinally moving web of sheet rubber into strips of the desired width to form the threads. Difficulty was encountered in cutting fine members of strip material with the desired accuracy for use in the winding of golf balls as distinguished from slitting machines wherein such strips of material are relatively wide compared to the rubber thread cut for golf ball winding.

The present invention deals especially with a novel method and apparatus which permits the accurate tensioning of rubber sheet material for precision cutting such stock into fine thread for use in the winding of golf balls.

Briefly, the invention includes the removal of excess moisture from the stock, dusting such stock, continuously moving thin sheet of rubber stock as it passes a sensing means which accurately positions the transverse location of the movable cutting head and winding such cut strips or threads onto spools with predetermined tension.

An object of the present invention is to provide a new and improved method of slitting elastomeric sheet stock into threads and spooling such elastic threads with predetermined tension.

Another object of this invention is to provide a novel method for accurately slitting elastic material into a plurality of fine continuous threads and thereafter spooling such threads onto separate reels with predetermined tension.

A further object of this invention is to accurately cut a continuously moving rubberized sheet of material into fine threads.

Another object of this invention is to provide a novel apparatus which accurately positions and maintains gang cutters in predetermined relationship with the moving elastic strip being cut.

A further object of this invention is to provide a new and improved sheet slitting apparatus whereby a more uniform fine cut is maintained facilitating uniform and properly tensioned spooling.

These and other objectives achieved by this invention will become apparent as the description proceeds in connection with the accompanying drawings, in which:

FIGS. 1a and 1b are perspective schematic views of the apparatus for preparing golf ball thread from a continuously moving sheet constructed in accordance with the principles of this invention which when longitudinally aligned show the entire apparatus of this invention.

FIG. 2 is a schematic showing of the control means in FIG. 1 for controlling the location.

FIG. 3 is a diagrammatic showing of the cutting means.

Figure 1B:
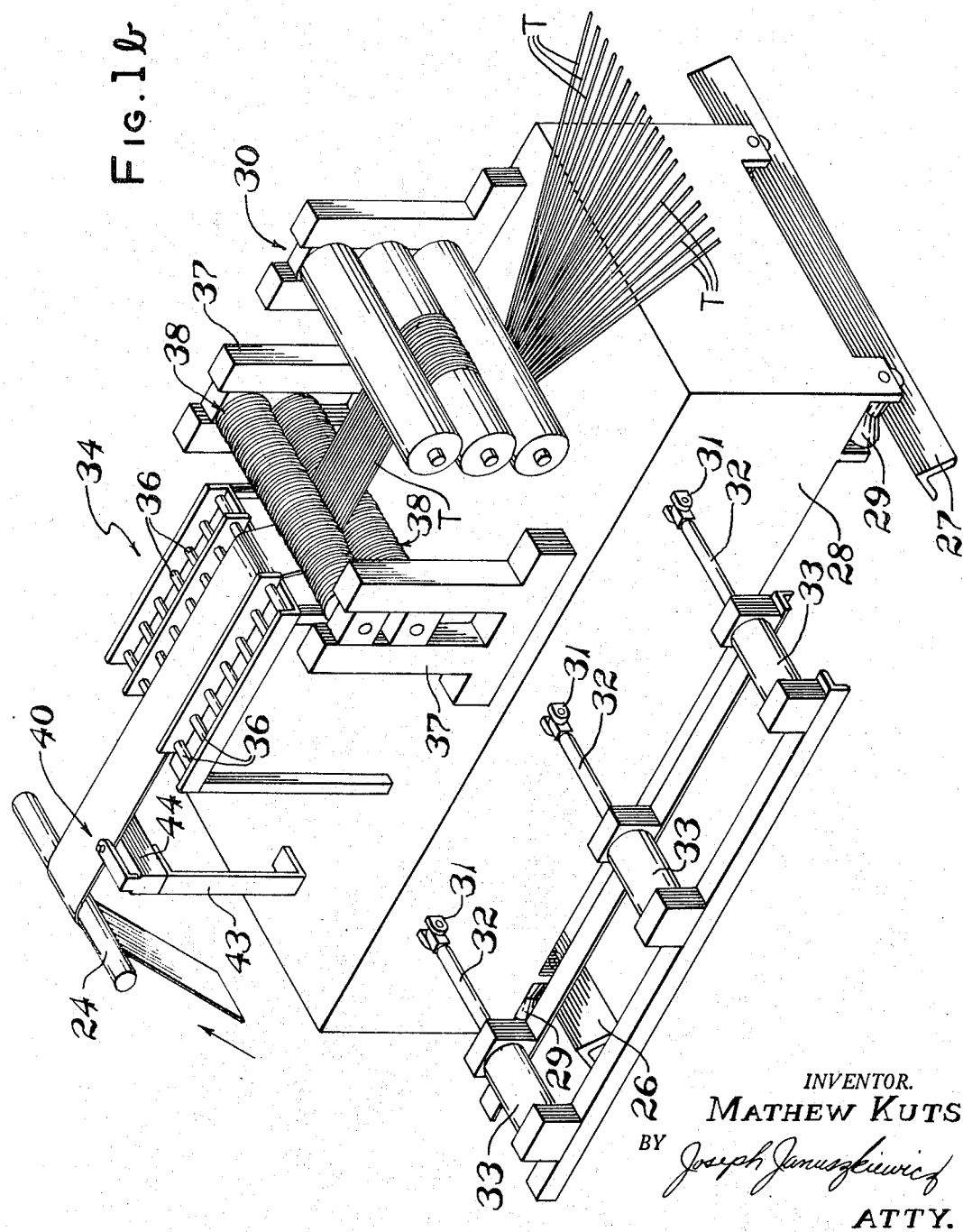

Referring to the drawings, wherein like reference characters designate like or corresponding parts throughout the several views, there is shown in FIG. 1a a tank 11 which contains a mixture of glycerine and water, a lubricant. Mounted on a support means not shown, adjacent one end of tank 11 is a stock supply roll 12 having a thin sheet of rubberized material thereon. The sheet material from stock roll 12 is fed therefrom over a guide roll 13 which is mounted above one edge portion of the tank 11 to guide such sheet material into the tank 11. A guide roll 14 is mounted in the lower portion of tank 11 substantially in line with the guide roll 13. Another guide roll 15 is mounted in the lower other end portion of tank 11 which is in the opposite end portion of the tank 11 relative to roll 14. Mounted directly above guide roll 15 and above the tank 11 is a set of pinch rolls 16, which pinch rolls 16 receive the sheet material from the guide roll 15. Another tank 17 is mounted adjacent the other end portion of tank 11. Mounted immediately above the other end of tank 11 closely adjacent the pinch rolls 16 is a guide roll 18 for directing a sheet of material from the pinch rolls 16 to the tank 17. Tank 17 has a guide roll 19 suitably journalled therein for guiding material from roll 18 into tank 17. Mounted above tank 17 and forwardly of roll 19 is a set of pinch rolls 21. Mounted above the forwardly most edge of tank 17 and closely adjacent the pinch rolls 21 is a guide roll 22 for directing sheet material from pinch rolls 21 downwardly beyond the edge of tank 17.

A tension control roll 23 mounted forwardly of the tank 17 has means for controlling the tension as is old and well known in the art of the sheet material that is trained thereunder for directing sheet material downwardly from roll 22 thence upwardly to a guide roll 24. The previously mentioned rolls 12, 13, 14, 15, 16, 18, 19, 21, 22, 23 and 24 have their axes in parallel with their support means not shown to more clearly show the relationship of parts. Tension control roll 23 is often referred to as a dancer roll. Wherein the roll 23 is adapted to be rotatably mounted between vertical guides such that the roll 23 will move upward to relieve any tension on the moving web of material. Movement of the roll 23 may be sensed by suitable limit switches or levers connected thereto which are not shown to control the speed of the supply roll thereby assuring that the sheet material passes from roll 23 with zero tension (without tension). Tension control rolls and their controls are well understood by those skilled in the art.

The strip of continuously moving material from roll 24 then passes to a cutting means which has a pair of parallel guide rails 26, 27 mounted on a base. The guide rails 26 and 27 are parallel to the axes of guide rolls 23 and 24. A carriage 28 having rollers 29 is mounted on the rails 26 and 27 for lateral adjustment relative to the stationary guide roll 24. Carriage 28 has several trunnions 31 secured to the lateral side portion whereby rods 32 (FIG. 2) of hydraulic cylinders 33 are connected thereto. Each cylinder 33 is secured to the base such that pressurization of the head end of the cylinder 33 operates to move the rod 32 rightwardly as viewed in FIGS. 1b and 2, which action imparts a similar motion to the carriage 28. Carriage 28 supports a receiving conveyor 34 which has a plurality of rollers 36 suitably mounted thereon for guiding the sheet material from the guide roll 24 to the slicing or cutter means. Mounted forwardly of the conveyor 34 on carriage 28 is a set of standards 37, 37 which support bearings of a pair of cutter means 38, 38. As seen in FIG. 3, each cutter means 38 comprises a shaft 39 which has a plurality of machined cutting disks or knives 41 spaced from each other by a plurality of spacers 42. Spacers 42 are of a smaller diameter than the knives 41.

The cutting discs 41 are located on the respective shafts 39 in such a manner that the projecting cutting borders of the disks 41 of one shaft penetrate into the spaces formed between the projecting cutting borders of the cutting discs 41 mounted on the other rotary shaft 39. Rotation of respective shafts 39 causes the discs 41 to cut the sheet material entering therebetween into threads or filaments T. The threads T are then guided past guide rolls 30 and thence through suitable eyelets for spooling onto reels in a manner well known and understood in the art.

Mounted on carriage 28 rearwardly of receiving conveyor 34 is a sensing head control means 40. As shown schematically in FIG. 2, sensing head control means 40 is secured to the carriage 28 via a bracket 43. Sensing head means 40 comprises a U-shaped support 44 secured to bracket 43, wherein the lower leg of support 44 guides the sheet material whereas the upper leg of support 44 has a nozzle 45 which is connected to a suitable source 46 for supplying pressurized air. The pressurized air entering nozzle 45 may be controlled via a valve 47. The lower leg of support 44 is adapted to support a pressure responsive valve means, designated 25, which is in line with the nozzle 45 wherein such valve means 25 is adapted to actuate a switch 48 to energize a solenoid control valve 49. Sheet material passing over the lower leg of support 44 is adapted to have its edge register with the nozzle 45 and the pressure responsive valve means 25 to throttle the flow of air into the pressure responsive valve means. In the event the sheet material substantially covers the pressure responsive valve means, switch 48 moves upwardly as viewed in FIG. 2 to close contact 51 to thereby energize solenoid B of control valve 49 via line 52. Control valve 49 operates to direct pressurized fluid via conduit 53 to the rod end of cylinder 33 which moves carriage 28 leftwardly as viewed in FIG. 2. Movement of carriage 28 leftward moves the receiving conveyor 34 leftwardly to thereby move the sheet material rightwardly relative to the nozzle 45. Such action uncovers the pressure responsive valve means to nozzle 45 which breaks the connection between switch 48 and contact 51 to de-energize solenoid B and thereby lock the piston in cylinder 33 in its newly adjusted position. In the event the sheet material moves rightwardly relative to the carriage 28 and the support 44, the air pressure via nozzle 45 moves switch 48 downwardly into engagement with contact 54 which thereby energizes solenoid A of control valve 49 via line 55. Control valve 49 directs pressurized fluid to the head end of cylinder 33, which action moves carriage 28, receiving conveyor 34 along with support 44 rightwardly until the flow of air via nozzle 45 is throttled by the edge portion of the sheet material to depressurize the pressure responsive valve means whereby switch 48 breaks the connection with contact 54 to de-energize solenoid A of control valve 49. Such movement of the carriage 28 operates to maintain the alignment between the plural cutting disks 41 and the sheet material as well as maintain the alignment between the edge of the sheet material and the cutting disk 41 nearest thereto to provide a consistently fine cut thread. A safety switch 50 is provided adjacent the support 44 to interrupt the electrical circuit whenever support 44 moves too far to the right (FIG. 2) upon absence of material passing through the support 44.

In the operation of the device, roll 12, having a continuously wound web of sheet rubber material thereon, feeds material over guide roll 13 into tank 11 which contains a solution of glycerine and water. A thin coat of solution is deposited on the sheet material to lubricate such material. The sheet material in tank 11 passes under a guide roll 14 to guide roll 15 which directs such sheet material upwardly to a set of pinch rolls 16 which squeezes off the excess solution of glycerine and water. The sheet material is then fed over guide roll 18 into tank 17 for dusting with magnesium carbonate powder. Tank 17 has a guide roll 19 which directs the sheet material through such tank, thence upwardly to a set of pinch rolls 21 which controls the amount of dust on the sheet material. The sheet material then passes over guide roll 22 to the tension control roll 23 which imparts substantially zero tension thereto. The sheet material is then directed over guide roll 24 past a sensing head control means 40, onto a receiving conveyor 34 for movement into the cutting disks 41 which cuts such sheet material into fine threads T. The sensing head control means 40 maintains the carriage 28 and cutting disks 41 in alignment with the continuously moving sheet material in a manner described above. Thereafter the cut thread passes through the guide rolls 30 for winding onto individual reels not shown.

Various modifications are contemplated and may obviously be resorted to by those skilled in the art without departing from the spirit and scope of the invention, as hereinafter defined by the appended claims, as only a preferred embodiment thereof has been disclosed.

I claim:

1. An apparatus for cutting an elastic web of material which has side edges and a longitudinal center line into a series of longitudinal strips along longitudinal slit lines, the combination comprising supply means for feeding such continuously moving web of material in a longitudinal direction, a carriage mounted on a base adjacent said supply means, said carriage having a longitudinal pass line parallel to said longitudinal direction and said center line, sensing means non-movably mounted on said carriage, said sensing means responsive to the position of said side edges of such moving web toward or away from said longitudinal direction to locate said carriage relative to said supply means to position said pass line into alignment with said center line, said carriage having a plurality of cutters thereon for slicing such elastic web into a plurality of thin longitudinal strips and said carriage having guide means thereon in alignment with said cutters and movable therewith to guide an elastic web from said supply means to said cutters.

2. An apparatus for cutting an elastic web of material which has a longitudinal center line into a series of longitudinal strips along longitudinal slit lines, the combination comprising supply means for feeding such continuously moving web of material along a longitudinal center line and longitudinal direction, a carriage mounted on a base adjacent said supply means, tension control means operatively mounted adjacent said carriage for reducing tension on such web of material while passing from said supply means to said carriage, said carriage having a longitudinal pass line parallel to said longitudinal direction and said center line, sensing means mounted on said carriage, said sensing means responsive to the position of such moving web to locate said carriage relative to said supply means to position said pass line into alignment with said center line, said carriage having a plurality of cutters thereon for slicing such elastic web into a plurality of thin longitudinal strips, conveyor guide means mounted on said carriage and movable therewith for alignment with said elastic web.

3. An apparatus for cutting an elastic web of material which has a longitudinal center line into a series of longitudinal strips along longitudinal slit lines, the combination comprising means for feeding elastic web along said longitudinal center line, a carriage movably mounted on a base, said carriage movable in a direction normal to said longitudinal direction, said carriage having a receiving conveyor, said receiving conveyor having rolls whose axes are normal to said longitudinal center line and said longitudinal direction, said conveyor having guide means thereon cooperative with said rolls to direct and guide such elastic web in a controlled longitudinal direction, tension control means mounted between said receiving conveyor and said feeding means for removing tension from said elastic web and imparting thereto substantially zero tension, cutting means mounted on said carriage for receiving such elastic web material from said receiving conveyor for cutting such elastic web material into a plurality of thin longitudinal strips.

4. An apparatus for maintaining an alignment between a supply means for a continuously moving web of elastic material having a longitudinal center line and a movable cutting means comprising a carriage mounted upon a pair of laterally extending ways, a receiving conveyor mounted on said carriage having a longitudinal pass line, said receiving conveyor having a pair of spaced guide means operative to maintain the side edges of such moving web parallel to said longitudinal pass line, said ways lying in parallel planes that are normal to said pass line, a pair of rolls mounted on said carriage, each of said rolls having a plurality of spaced cutter disks with the disks on one roll cooperating with the disks on the other of said rolls to cut the web of material passing thereto from said receiving conveyor into thin longitudinal strips, and sensing means non-movably mounted on said carriage operative to position said carriage in response to the location of the edge of the elastic material passing from said supply means to said receiving conveyor to maintain a predetermined aligned relationship between said longitudinal pass line to said longitudinal center line.

5. An apparatus for preparing golf ball thread comprising a supply means for presenting a continuously moving elastic web along a longitudinal direction with one edge of said moving web being a reference line, a carriage movable in a linear direction normal to said reference line and said longitudinal direction, energizable means operable to move said carriage selectively in said linear direction, cutting means on said carriage operable to cut such web material passing thereto from said supply means into thin longitudinal strips, said carriage having a center pass line parallel to and in alignment with said longitudinal direction, said carriage having a receiving conveyor mounted thereon for movement therewith, said conveyor having a pair of spaced parallel guide means operative to guide such elastic web to said cutting means, and sensing means non-movably mounted on said carriage responsive to movement in said reference line for actuating said energizable means to move said carriage and maintain a predetermined lateral distance between said center pass line with said reference line.

6. An apparatus as set forth in claim 5 wherein said supply means includes means for removing the tension on such elastic web prior to delivery to said carriage.

References Cited

UNITED STATES PATENTS

| 2,004,085 | 6/1935 | Shaw | 264—147 X |
|---|---|---|---|
| 2,120,721 | 6/1938 | Spanel | 264—147 |
| 3,086,483 | 5/1962 | Porter | 83—368 X |
| 3,104,789 | 9/1963 | Fife | 118—6 X |
| 797,791 | 8/1905 | Cameron | 83—368 |
| 3,072,309 | 1/1963 | Hill | 242—56.2 X |
| 3,073,197 | 1/1963 | Gowin | 83—368 |
| 3,176,567 | 4/1965 | McCormick et al. | 83—368 X |

FOREIGN PATENTS 955,552    4/1964   Great Britain.

JAMES M. MEISTER, *Primary Examiner.*

ALFRED L. LEAVITT, WILLIAM W. DYER, JR.,
*Examiners.*

A. M. GRIMALDI, *Assistant Examiner.*